(12) United States Patent
Benett et al.

(10) Patent No.: US 6,273,478 B1
(45) Date of Patent: Aug. 14, 2001

(54) MICROFLUIDIC INTERCONNECTS

(75) Inventors: William J. Benett, Livermore; Peter A. Krulevitch, Pleasanton, both of CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 09/281,345

(22) Filed: Mar. 30, 1999

(51) Int. Cl.[7] ................................. F16L 21/03
(52) U.S. Cl. .................... 285/346; 285/338; 285/379
(58) Field of Search ................... 285/346, 379, 285/334.5, 234, 364, 338, 231

(56) References Cited

U.S. PATENT DOCUMENTS

| | | | | |
|---|---|---|---|---|
| 494,918 | * | 4/1893 | Evans | 285/346 |
| 1,045,495 | * | 11/1912 | Austin | 285/346 |
| 2,243,356 | * | 5/1941 | Olson | 285/338 |
| 2,460,981 | * | 2/1949 | Francison, Jr. et al. | 285/233 |
| 2,477,533 | * | 7/1949 | Whiting | 285/334.3 |
| 3,430,990 | * | 3/1969 | Nelson | 285/364 |
| 4,122,862 | * | 10/1978 | Brandelli | 285/356 |
| 4,538,842 | * | 9/1985 | Kowal et al. | 285/234 |
| 5,364,135 | * | 11/1994 | Anderson | 285/334.5 |
| 5,375,893 | * | 12/1994 | Guest | 285/379 |

FOREIGN PATENT DOCUMENTS

| | | | | |
|---|---|---|---|---|
| 285215 | * | 2/1928 | (GB) | 285/334.5 |

\* cited by examiner

Primary Examiner—Eric K. Nicholson
(74) Attorney, Agent, or Firm—L. E. Carnahan; Alan H. Thompson

(57) ABSTRACT

A miniature connector for introducing microliter quantities of solutions into microfabricated fluidic devices, and which incorporates a molded ring or seal set into a ferrule cartridge, with or without a compression screw. The fluidic connector, for example, joins standard high pressure liquid chromatography (HPLC) tubing to 1 mm diameter holes in silicon or glass, enabling ml-sized volumes of sample solutions to be merged with $\mu$l-sized devices. The connector has many features, including ease of connect and disconnect; a small footprint which enables numerous connectors to be located in a small area; low dead volume; helium leak-tight; and tubing does not twist during connection. Thus the connector enables easy and effective change of microfluidic devices and introduction of different solutions in the devices.

14 Claims, 4 Drawing Sheets

MICROFLUIDIC INTERCONNECTS

RELATED APPLICATION

The present invention relates to and constitutes an improvement over the invention described and claimed in copending U.S. application Ser. No. 09/090,769 filed Jun. 4, 1998, entitled "Microfluidic Interconnects", and assigned to the same assignee.

The United States Government has rights in this invention pursuant to Contract No. W-7405-ENG48 between the United States Department of Energy and the University of California for the operation of Lawrence Livermore National Laboratory.

BACKGROUND OF THE INVENTION

The present invention relates to microfabricated fluidic devices, particularly to miniature fluidic connectors, and more particularly to miniature (milli to micro) connectors utilizing a molded ring or seal set in a ferrule cartridge for introducing fluids or gases to microfabricated fluidic devices or interconnecting various microfluidic devices.

While the ability to fabricate micron-scale mechanical and fluidic structures out of silicon, glass, and plastic is advancing rapidly, one of the main challenges continues to be interfacing these microfabricated devices to each other and to the outside, macroscopic world. Very little effort has been directed to meet this need. For example, institutions performing leading-edge microfluidics research are still connecting devices using epoxy, which is permanent, can cause channel clogging, and cannot withstand significant pressures or other mechanical loading. There is great promise for miniature deployable microfluidic systems which monitor the environment for airborne toxicants, and hand-held medical diagnostic instruments incorporating microfluidic chips. However, introducing fluid samples and reagents into the microfluidic device is challenging, especially when multiple inputs are required.

The invention of the above-referenced application Ser. No. 09/090,769 directly addressed this need in a manner which is easy to connect and disconnect without the problem of tube twisting during installation. The present invention involves an improvement over that of the above-referenced application by use of a molded ring or seal set into a ferrule cartridge, with or without a compression screw. Also, the present invention utilizes no adhesives to make the connection, thus providing a means for quick and easy exchange of microfabricated components. Further, the miniature connectors of the present invention have a low dead volume, are helium leak-tight, can withstand high pressures, and have a small footprint, allowing for multiple connections to be made in a very small area, thereby retaining the advantages of miniaturization.

SUMMARY OF THE INVENTION

It is an object of the invention to provide miniature connectors for introducing fluids, either liquid or gaseous, into microfluidic devices.

A further object of the invention is to provide a fluidic connector which is easy to connect and disconnect multiple times, and no tools are required to connect and disconnect tubing.

A further object of the invention is to provide a miniature fluidic connector which allows for ease of design and manufacture of the packaging required for microfluidic devices.

A further object of the invention is to provide fluidic connectors applicable to many types of microfluidic devices without redesign, making the connector suitable as a standard approach for interfacing microfluidic devices to larger fluidic components and to each other.

A further object of the invention is to provide a miniature connector which uses standard tubing, allowing for adaptation to systems using standard connection systems, such as HPLC connectors.

Another object of the invention is to provide a miniature fluidic connector using no epoxy or adhesive, has a small footprint, is helium leak-tight, and is suitable for high pressure (hundreds to thousands of psi) applications where the inner diameters of the tubing and microfluidic device are small (mm to $\mu$m).

Another object of the invention is to provide miniature fluidic connectors that utilize stiff tubing wherein the tubing tip is inserted into or butted up against the microfluidic device and a molded ring set into a ferrule engage with a formed end of the tubing to create a leakproof seal and mechanically lock the tubing in place.

Another object of the invention is to provide microfluidic interconnects utilizing a molded ring set into a ferrule cartridge, with or without a compression screw.

Other objects and advantages of the present invention will become apparent from the following description and accompanying drawings. Basically, the present invention involves microfluidic interconnects utilizing a fluidic connector suitable for introducing or removing gas or liquids to or from microfluidic devices. The connector interfaces one microfluidic device with another, or with a larger fluidic component and is adaptable to many types of microfluidic devices, making it an excellent candidate for a standard connector. The connector can withstand hundreds to thousands of psi pressure. The connector is easy to assemble and disassemble, requiring no tools or adhesives, uses standard tubing, is extremely compact, can be used to make multiple connections in a small area, and requires only simple packaging of the microfluidic device. The present invention is suitable for making fluidic connections to microfluidic devices used for many applications, such as portable and/or deployable counter-biological warfare systems, including PCR and flow-cytometer-based instruments; devices for sequencing or manipulating DNA; handheld, portable, or bench-top microfluidic-based medical diagnostic instruments; microfluidic devices for drug discovery, chemical analysis, and environmental monitoring; micro-channel heat sinks; and fluid droplet ejectors such as ink jet print heads.

The miniature connector of the present invention is made using machining, molding, or otherwise forming the end of a stiff tubing, such as polyetheretherbetone (PEEK), so that the tip of the tubing may insert into or butt up against the microfluidic device and such that a ferrule and molded ring or seal may engage with a formed (grooved) end of the tubing to create a leakproof seal and mechanically lock the tubing in place. The connector can be incorporated into a design having multiple connections which are made simultaneously using an array of tubes held by a plug-in strip or a polar manifold type connector. The molded ring is set in a ferrule cartridge with or without a compression screw.

BRIEF DESCRIPTION OF THE DRAWINGS

The accompanying drawings, which are incorporated into and form a part of the disclosure, illustrate embodiments of the invention and a procedure for carrying out the invention, and, together with the description, serve to explain the principles of the invention.

DETAILED DESCRIPTION OF THE INVENTION

Figure 1:
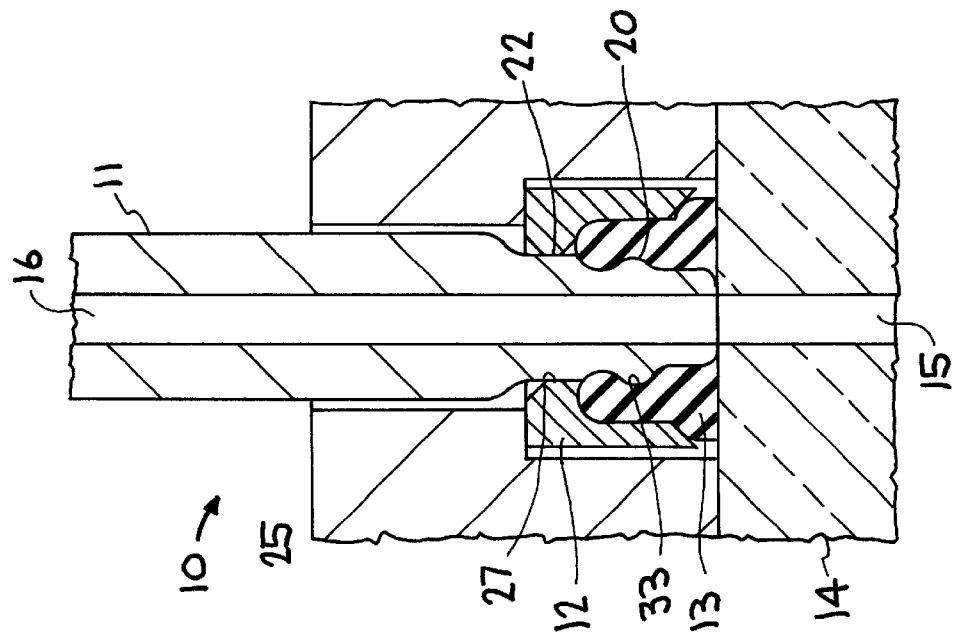
FIGS. 1 and 2 are cross-sectional views of an embodiment of a miniature connector made in accordance with the present invention which uses a molded ring which inserts into a ferrule cartridge, with the ferrule cartridge placed in a counter-sunk hole in the package.

The present invention is directed to microfluidic interconnects, and more specifically to fluidic connectors for introducing liquids or gases to and extracting them from microfluidic devices. If microfluidic devices are to achieve wide-scale use, a standardized system must be established for interfacing the devices with each other and with larger fluidic components and systems, such as pumps, filters, syringes, aerosol collectors, flow cytometers, and chemical analyzers. Some of the large-scale connection systems include Luer fittings, high pressure liquid chromatography (HPLC) connectors, etc. Until recently, no widely applicable, easy to assemble and disassemble, small-sized connection system has been demonstrated for interfacing to the mm and sub-mm scale channels found in microfluidic devices.

Microfluidic devices, with dimensions from microns to millimeters, are typically made from silicon, glass, and plastic using fabrication techniques, such as photolithography, etching, electroplating, thin film deposition, conventional machining, embossing, and bonding. These devices have components such as channels, pumps, valves, sensors, reaction chambers, particle separators, and electronics. The miniature connectors of the above-referenced application and the present invention provide a means for interfacing microfabricated fluidic devices to larger fluid components, such as pumps, valves, syringes, and aerosol collectors, and to each other. These miniature connectors enable introducing microliter and sub-microliter quantities of solutions into the microfabricated fluidic devices. The connector of the present invention, like that of the above-referenced application, joins HPLC stiff (PEEK) tubing to silicon, glass, or plastic microfabricated fluidic devices enabling ml-sized volumes of sample solutions to be merged with $\mu l$ or sub-$\mu l$ sized devices, or for interconnecting various microfluidic devices to each other.

The miniature connectors utilizing a molded ring or seal set into a ferrule cartridge, as described hereinafter, can be used with many types of microfluidic devices and with the incorporation of packaging that is easy to design and manufacture. In addition, since standard tubing is used, it makes it simple to adapt to other types of connection arrangements. Other advantages include easy installation, no epoxy required, quick connection and disconnection with no tools required, small footprint, helium leak-tight, high working pressures, and small dead volumes. For these reasons, the connector of this invention has the potential to become a connector standard for microfluidic devices. One embodiment of the connector, that illustrated in FIGS. 5 and 6, has been extensively experimentally utilized with excellent results, allowing for easy and effective exchange of microfluidic devices and the introduction of different solutions into the microfluidic devices. In addition, due to the small footprint of the connector, such allows for multiple connections without compromising the small device size, and thus enables the use of low-profile socket-type multi-connectors, such as the linear manifold and polar manifold arrangements described hereinafter.

Figure 2:
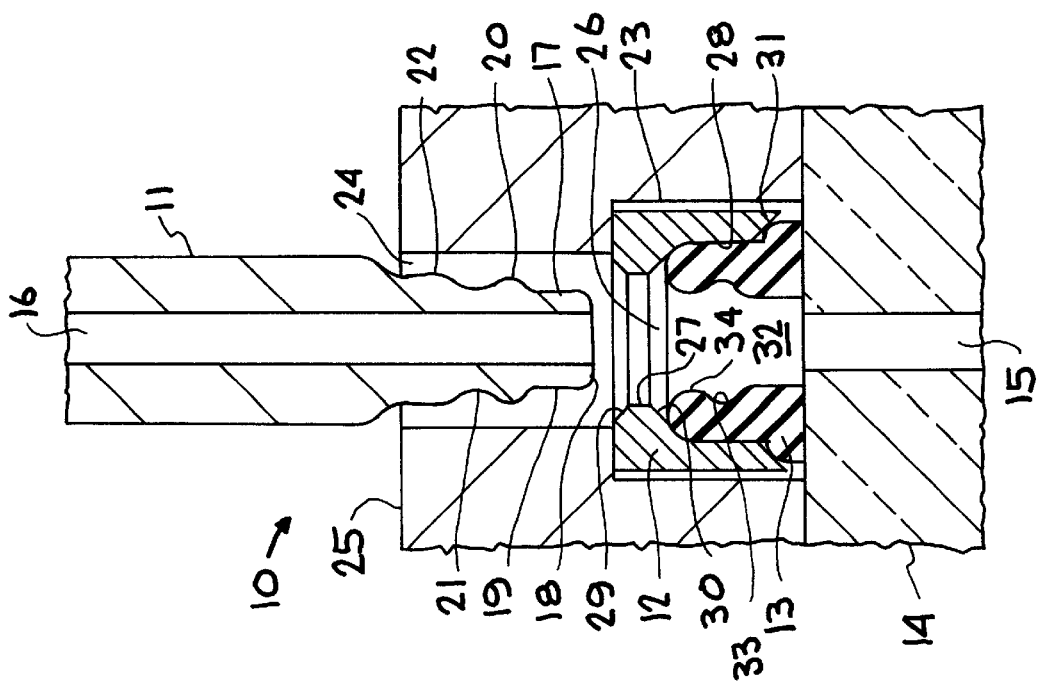

Referring now to the drawings, FIGS. 1 and 2 illustrate an embodiment of a miniature fluid connector generally indicated at 10 using a tube 11 having a formed tip with the tip in an opening of a ferrule or ferrule cartridge 12 containing a molded ring or elastomer seal 13, located, for example, in a pc board/package. In this example, as shown in FIG. 1, the microfabricated fluidic device 14, such as a fluidic chip, is, for example, made of glass with a drilled fluidic input port or opening 15 having, for example, a 1 mm diameter. The stiff tube 11, such as an HPLC-PEEK tubing, includes an opening 16 and a tip or end section 17 that is machined to form a flat end 18 which abuts with the fluidic device 14 and extends around the input port 15 in the device 14, whereby opening 16 in tube 11 is aligned with opening or inlet port 15 in device 14. The end section or tip 17 of tube 11 includes different diameter portions 19, 20, 21 and 22, with portion 20 being of a greater diameter than portions 19 and 21. The ferrule cartridge 12 is located in a countersink or enlarged section 23, of an opening 24 in a package or member 25 which is secured to the fluid device 14 and includes an opening 26 having different diameter sections 27 and 28 and tapering sections 29, 30 and 31. The molded ring 13 has an opening 32 with an enlarged central diameter section 33 and a curved end section 34. The ferrule cartridge 12 and the molded ring 13 may be retained within package 25, for a quick connect/disconnect fitting.

When the tube 11 is inserted through the opening 24 in package 25 and through the opening 26 of ferrule cartridge 12 and opening 32 in molded ring or elastomer seal 13 to abut fluidic device 14, whereby opening 16 in tube 11 aligns with inlet port 15 of device 14, the sections 19, 20 and 21 of tube 11 are in contact with opening 32, central section 33 and curved end section 34 of molded ring 13 whereby section 20 of tube 11 is retained in central section 33 of molded ring 13; and section 22 of tube 11 is in contact with opening section 27 of ferrule cartridge 12, as shown in FIG. 2, thereby providing a seal between tube 11 and molded ring 13, which prevents leakage around opening 16 of tube 11. In view of the configuration of sections 19–22 of tip 17 of tube 11 and the configuration of the openings in ferrule cartridge 12 and molded ring 13, the tube 11 can be readily removed from package 25 and reinserted as needed. Because the tube 11 is butted flush up against the device 14, this allows the possibility of a zero dead volume seal.

Figure 3:
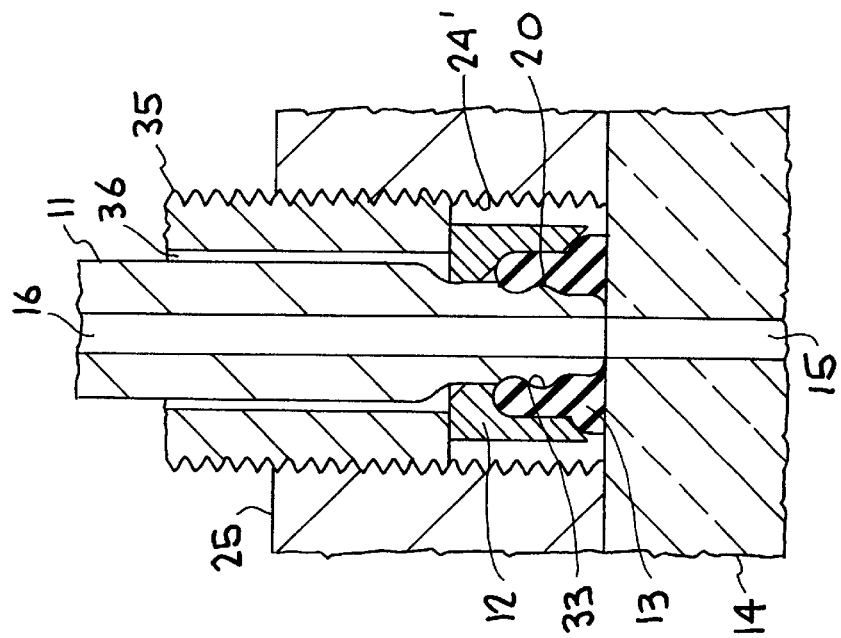
FIGS. 3 and 4 illustrate the connector of FIGS. 1–2 with the addition of a compression screw for pressing on the ferrule cartridge, and wherein the tube is inserted and the screw is then tightened to form the seal.
Figure 4:
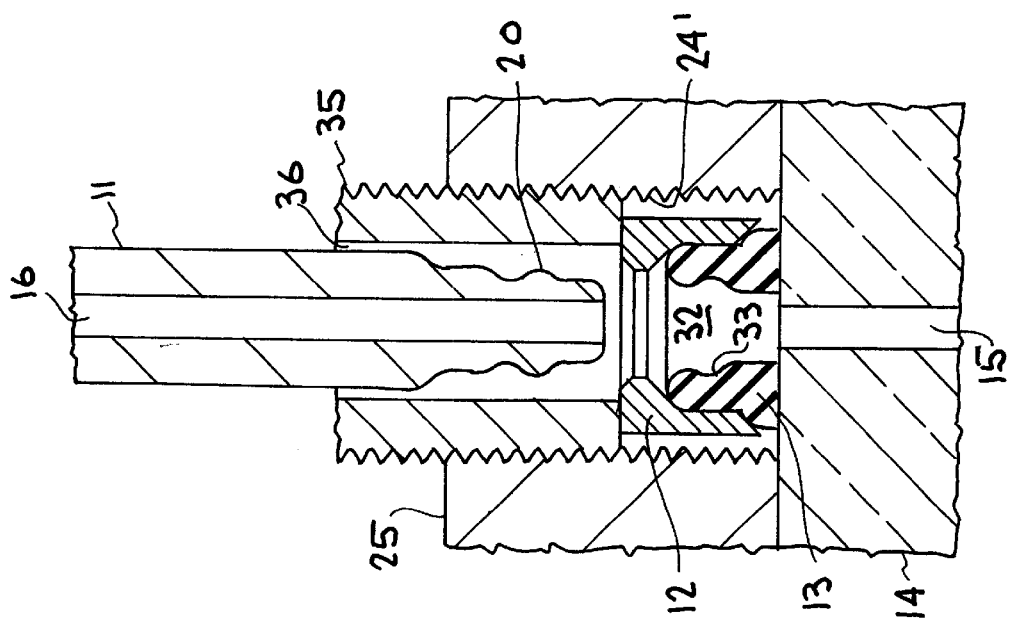
Figure 7:
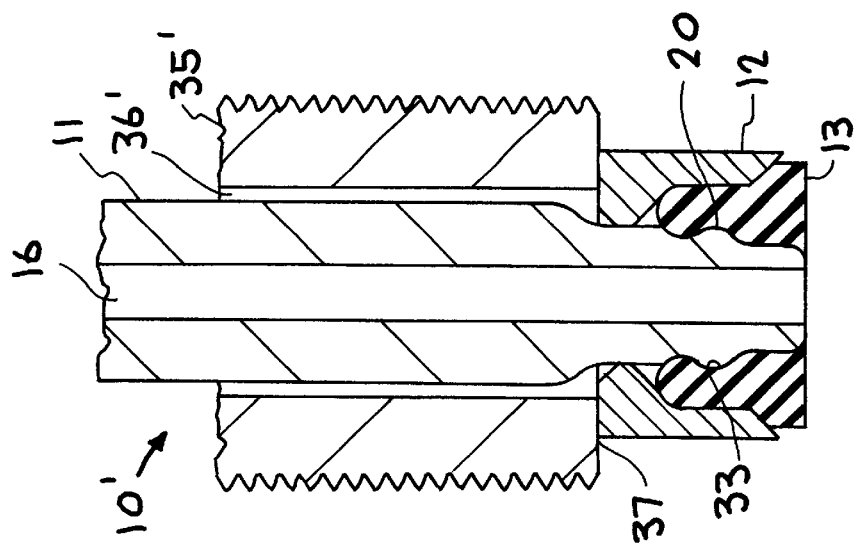
FIGS. 7 and 8 illustrate a connector with a connected compression screw assembly, such as utilized in the FIGS. 3–4 embodiment.
Figure 8:
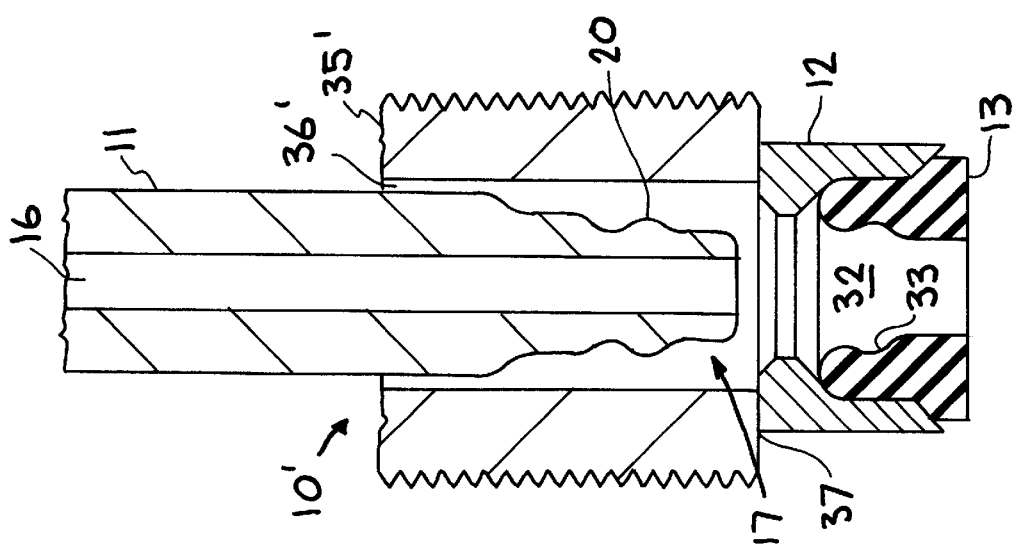

The embodiment of FIGS. 3–4 differ from the FIGS. 1–2 embodiment by the use of a compression screw to retain the ferrule cartridge, and like components are given corresponding reference numerals. As shown in FIGS. 3 and 4, the package 25 is provided with a threaded opening 24' which extends therethrough and into which is threaded a compression screw 35 having an opening 36 through which passes the tube 11 to be secured in the molded ring 13 retained in ferrule cartridge 12. As seen in FIGS. 3 and 4 the compression screw 35 is inserted to retain the ferrule cartridge 12 in the opening 24' of package 25, after which the tube 11 is inserted into the molded ring 13 and ferrule cartridge 12, as described above with respect to the embodiment of FIGS. 1–2. Loosening of the compression screw 35 before disengaging the tube 11 will prolong the lifetime of the interconnect. The compression screw 35 may be secured to the ferrule cartridge 12 as shown in FIGS. 7 and 8, or it may be a separate component. The compression screw may be utilized to change the pressure on the molded ring and thus the sealing pressure to enable, for example, a high pressure seal or a quick connect/disconnect seal.

Figure 5:
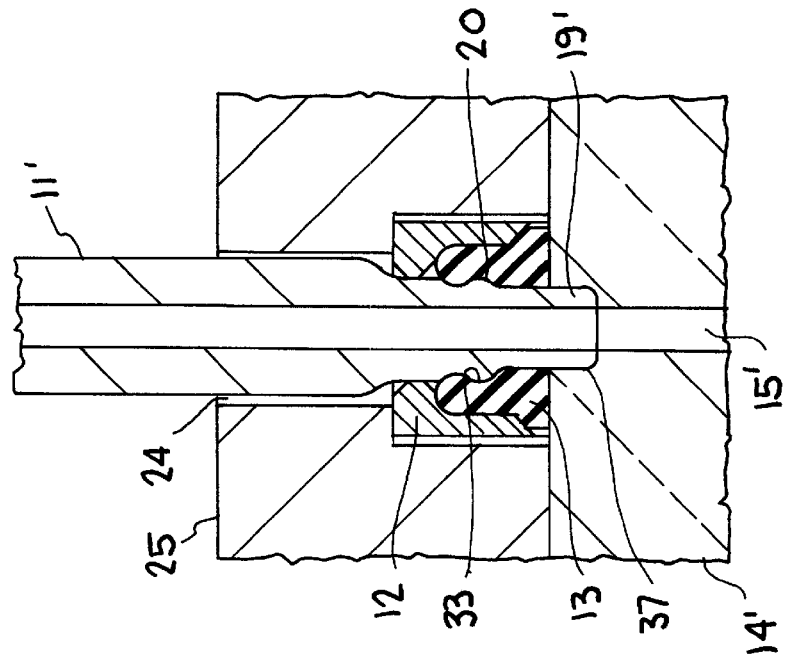
FIGS. 5 and 6 illustrate the connector of FIGS. 1–2, but with the tip of the tubing inserted into the microfabricated component.
Figure 6:
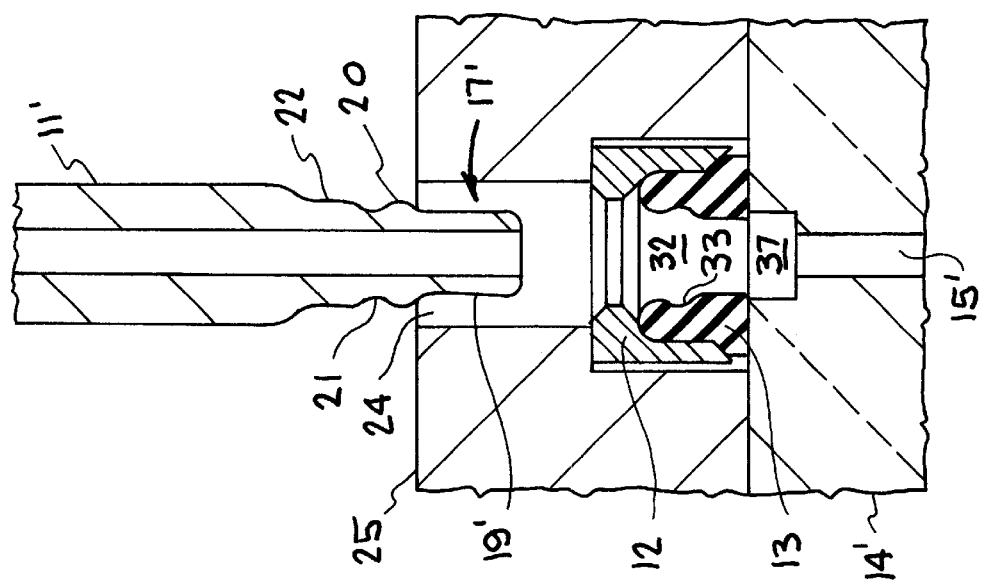

The embodiment of FIGS. 5 and 6 differs from that on FIGS. 1–2 in that the end section or tip of the tube extends into the inlet port of the fluidic device. The same components as those of FIGS. 1–2 are given the same reference numerals. As shown in FIGS. 5 and 7, the tube 11' includes an end section or tip 17' wherein the reduced diameter section 19' is of a greater length than section 19 of the tube 11 of FIGS. 1–2. The fluid device 14' has an inlet port or opening 15' which includes an enlarged section or countersink 37. As seen in FIG. 6, when tube 11' is inserted into ferrule cartridge 12 and molded ring 13 the section 19' of tip 17' of the tube extends into countersink 37 of inlet port 15', and is secured in ferrule cartridge 12 and molded ring 13 as in the FIGS. 1–2 embodiment. A compression screw arrangement as in FIGS. 3–4 can be utilized with an extended tube tip as in FIGS. 5–6. A connector of this design was tested and found to be helium leak-tight and was pressure tested to 800 psi before failure.

FIGS. 7 and 8 illustrate an embodiment of the improved microfluidic interconnect which basically involves a ferrule cartridge, a molded ring or seal, a tube having a tip configured to cooperate with the interior of the molded ring and the ferrule cartridge, and a compression screw secured to the ferrule cartridge to maintain the ferrule cartridge in a centered position of the compression screw for alignment purposes. Corresponding components to components in the FIGS. 3–4 embodiment have been given corresponding reference numerals. As shown in FIGS. 7 and 8, the ferrule cartridge 12 includes a molded ring or seal 13 into which the tip 17 of tube 11 is to be inserted. The ferrule cartridge 12 is secured, as by welding, bonding, etc., as indicated at 37 etc., to a threaded compression screw 35' having an opening 36', which, as shown in FIGS. 3–4, is adapted to be threaded into a threaded opening in a package, for example. The ferrule 12 and compression screw 35' may be made from one piece. However, the compression screw 35' may be provided with threads constructed to enable it to be screwed into a non-threaded opening. Also, as shown in FIG. 8, the interconnect 10' may have the tube 11 inserted through the opening 36' of compression screw 35' into the ferrule cartridge 12 and molded ring 13, and then the compression screw 35' is threaded into a member, such as package 25 of FIGS. 3–4 to align the tube 11 and opening 16 therein with an opening in an associated component, and seal the tube 11 thereto.

It has thus been shown that the present invention provides improved microfluidic interconnects which incorporate a molded ring set in a cartridge, with or without a compression screw, and has the following advantages:

1. The molded ring or elastomer seal and the compression screw can be assembled into one unit.

2. The molded ring can be designed to have the tube butt flush up against the device allowing the possibility of a zero dead volume seal.

3. The molded ring can be contained within the package and used as a quick connect/disconnect fitting.

4. The molded ring can be used in conjunction with a compression screw that can vary the pressure on the ring, thus varying the sealing pressure, which allows adjustments of the seal pressure to enable either a low compression quick connect/disconnect seal or a high pressure seal.

While particular embodiments of the improved microfluidic interconnect have been illustrated and described to exemplify and teach the principles of the invention, such are not intended to be limiting. Modifications and changes may become apparent to those skilled in the art, and it is intended that the invention be limited only by the scope of the appended claims.

What is claimed is:

1. A microfluidic interconnect comprising:
    a member having an opening therein,
    a tube located in said opening and having a reduced external diameter end section,
    said tube additionally including at least one protruding section in said reduced diameter end section,
    a molded ring defining a seal located in said opening in of said member, and having an internal enlarged section, when said tube is installed in said molded ring said protruding section of said tube is positioned in said enlarged section of said molded ring,
    said molded ring being constructed to form a leak-tight seal adjacent an associated member and to provide mechanical retention of said tube,
    a compression screw for compressing said molded ring, and
    a ferrule retaining said molded ring at least partially within said ferrule.

2. The interconnect of claim 1, wherein compression screw is secured to said ferrule.

3. A microfluidic interconnect comprising:
    a member having an opening therein,
    a tube located in said opening and having a reduced external diameter end section,
    said tube additionally including at least one protruding section in said reduced diameter end section,
    a molded ring defining a seal located in said opening of said member, and having an internal enlarged section, when said tube is installed in said molded ring said protruding section of said tube is positioned in said enlarged section of said molded ring,
    said molded ring being constructed to form a leak-tight seal adjacent an associated member and to provide mechanical retention of said tube, and
    said tube additionally including an extended tip of a diameter less than said reduced external diameter end section.

4. The interconnect of claim 3 wherein said associated member includes an opening therein, and wherein said tip of said tube is positioned in said opening of said associated member.

5. A microfluidic interconnect comprising:
    a member having an opening therein,
    a tube located in said opening and having a reduced external diameter end section,
    said tube additionally including at least one protruding section in said reduced diameter end section,
    a molded ring defining a seal located in said opening of said member, and having an internal enlarged section, when said tube is installed in said molded ring said protruding section of said tube is positioned in said enlarged section of said molded ring,
    said molded ring being constructed to form a leak-tight seal adjacent an associated member and to provide mechanical retention of said tube, said molded ring being mounted at least partially within a cartridge and said cartridge being adopted to be mounted in an associated member into which said tube is inserted, said cartridge comprising a body member having an opening therethrough and a plurality of different diameter sections located along said opening, and wherein said tube includes a plurality of different diameter sections, and wherein said tube, when inserted into said cartridge, is positioned such that certain of said different diameter sections of each of said cartridge and said tube are in contact.

6. The interconnect of claim 5, where in said molded ring is retained in said cartridge and wherein said cartridge is secured to a compression screw.

7. A microfluidic interconnect comprising:

a member having an opening therein, a tube located in said opening and having a reduced external diameter end section, said tube additionally including at least one protruding section in said reduced diameter end section, and a molded ring defining a seal located in said opening of said member, and having an internal enlarged section, when said tube is installed in said molded ring said protruding section of said tube is positioned in said enlarged section of said molded ring, said molded ring being constructed to form a leak-tight seal adjacent an associated member and to provide mechanical retention of said tube, said molded ring being retained in a ferrule cartridge, and said tube includes a tip section having said protruding section, said protruding section of said tip of said tube being located in an indentation in said molded ring when said tube is inserted into said molded ring.

8. A miniature fluidic connector for providing leak-tight fluid interconnection between two abutting members, a first member having a fluid passageway therein, a second member abutting the first member and having an opening therein aligned with said fluid passageway of said first member, said fluidic connector being located in said opening of said second member and including a tube having a reduced diameter section containing at least an external protruding section, and a molded ring having an internal indentation, whereby said protruding section of said tube is located in said internal indentation of said molded ring.

9. The connector of claim 8, wherein an end of said reduced diameter section of said tube abuts said first member and is aligned with said fluid passageway in said first member.

10. The connector of claim 8 wherein an end of said reduced diameter section of said tube extends into said fluid passageway in said first member.

11. The connector of claim 8, additionally including a cartridge mounted in said opening of said second member, said molded ring being located at least partially within said cartridge.

12. The connector of claim 11, additionally including a compression screw for maintaining said cartridge in said opening of said second member.

13. The connector of claim 12, wherein said compression screw is secured to said cartridge.

14. The connector of claim 8, wherein said first member comprises a microfluidic device and wherein said second member comprises a packaging for the microfluidic device.

* * * * *